April 18, 1967    T. MATYAS ETAL    3,314,380
BULKHEAD
Filed Oct. 22, 1964    3 Sheets-Sheet 1
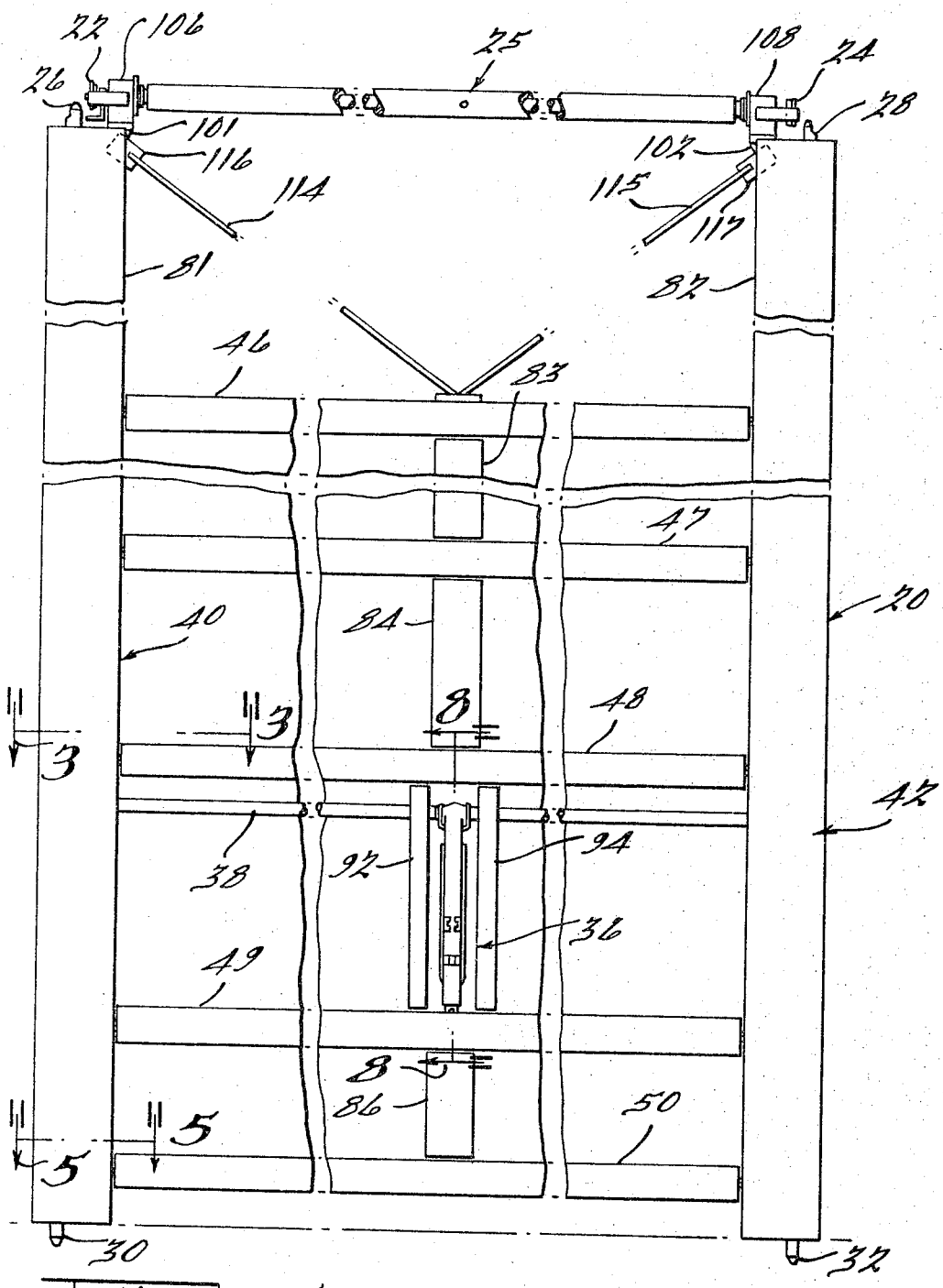

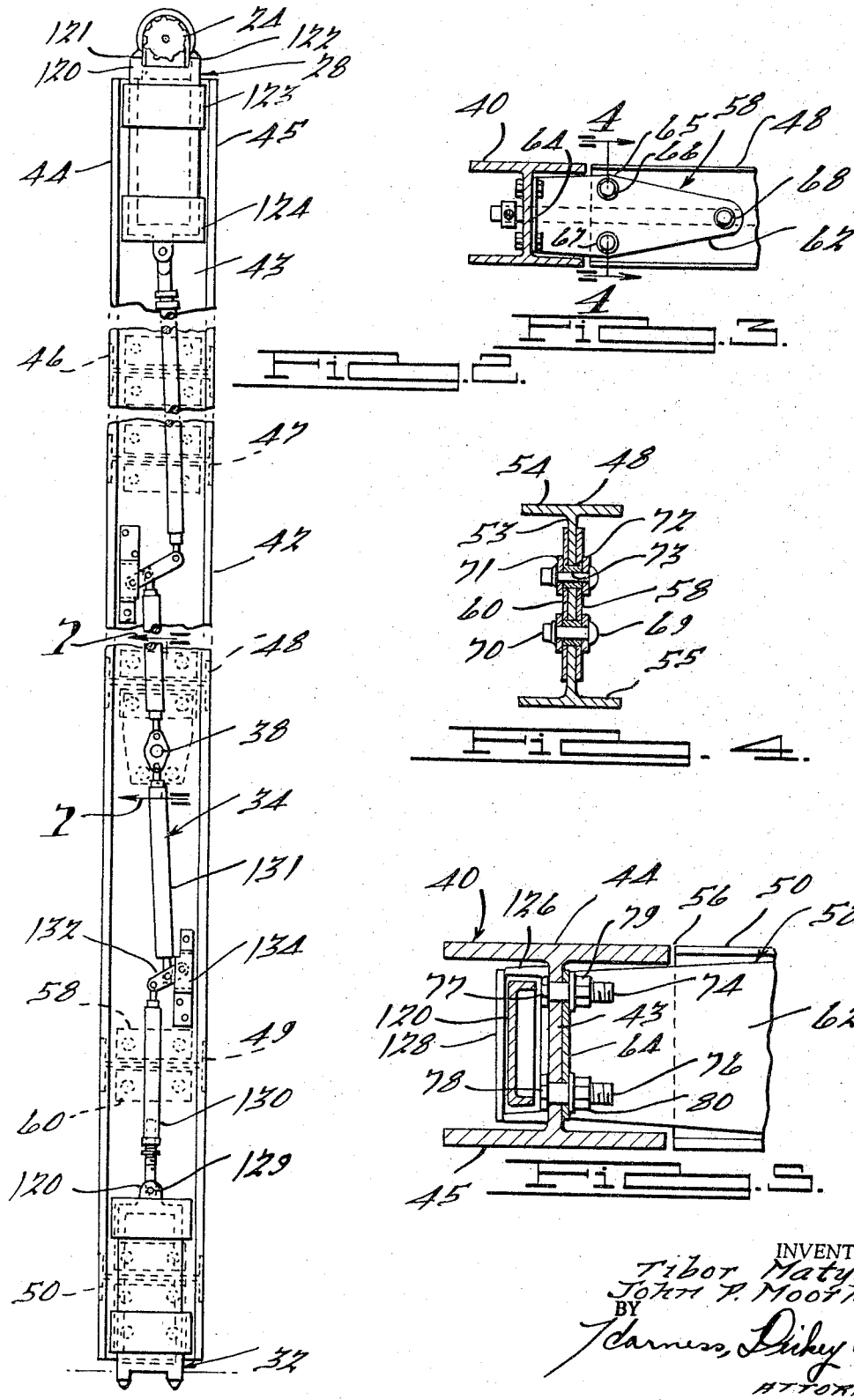

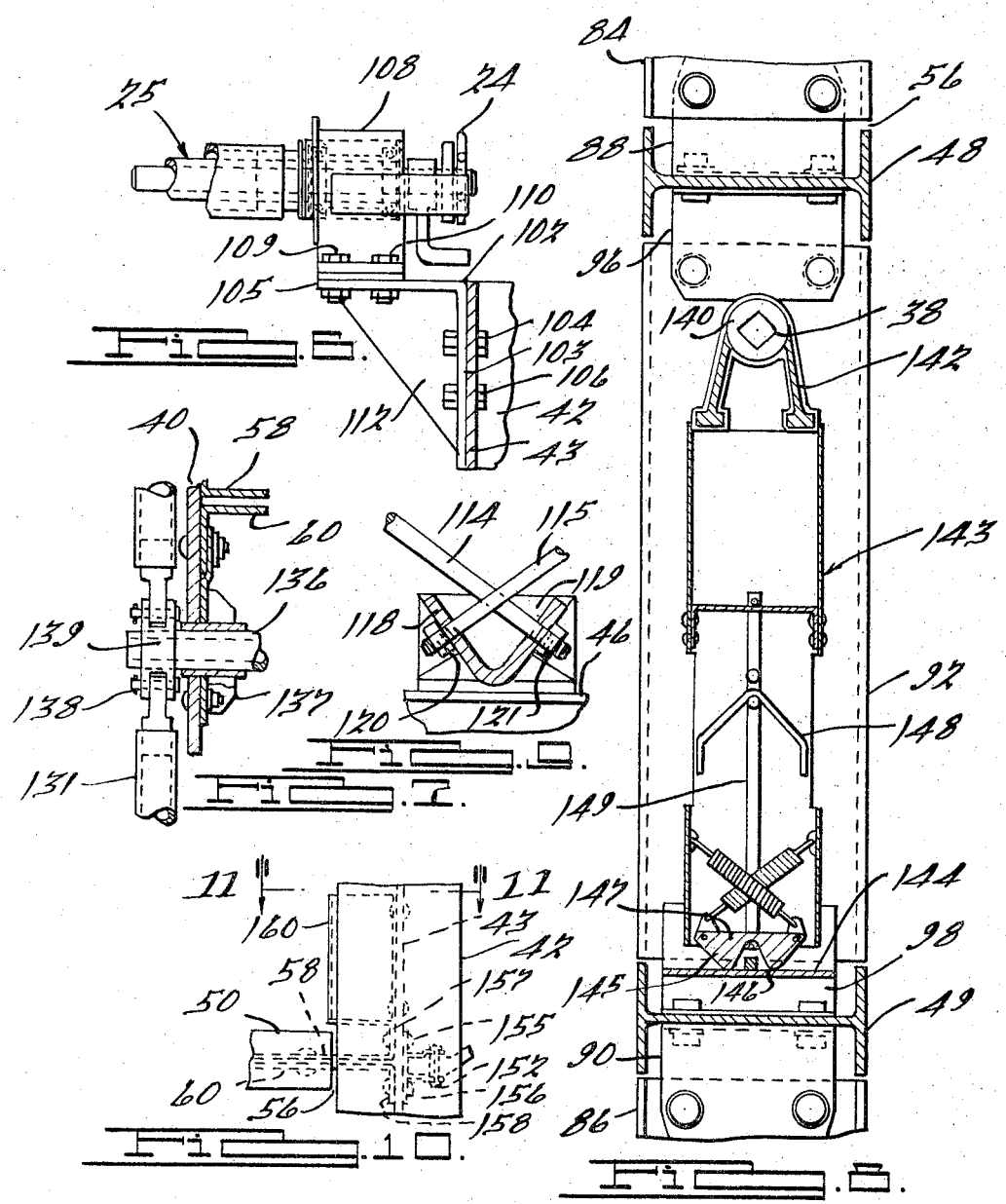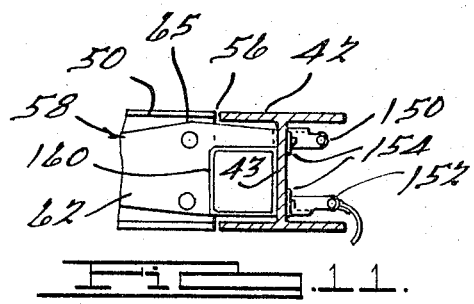

United States Patent Office 3,314,380
Patented Apr. 18, 1967

3,314,380
BULKHEAD
Tibor Matyas, Plymouth, and John P. Moorhead, Northville, Mich., assignors to Evans Products Company, Plymouth, Mich., a corporation of Delaware
Filed Oct. 22, 1964, Ser. No. 405,775
1 Claim. (Cl. 105—376)

The invention relates to material handling equipment and more particularly to new and improved bulkhead apparatus.

In the transportation of goods in railroad box cars and the like, movable bulkheads are widely used to separate, store, and contain the goods. Such bulkheads should, of course, be strong, durable, rugged, and able to withstand great stress in use. It is also desirable to reduce the weight of the bulkhead to increase maneuverability as well as to reduce the additional load added to the box car and the space occupied therein.

While the present invention is generally directed broadly to a bulkhead concept which greatly simplifies construction and assembly, and hence, reduces manufacturing costs, the inventive principles are also specifically embodied in a bulkhead which:

(1) Is formed in a novel manner from primarily conventional structural components such as I beams;

(2) Is formed primarily of conventional structural components interconnected in a novel manner;

(3) Is constructed in a manner enabling and facilitating alignment of the side surfaces of the bulkhead with the cross-sectional configuration of the box car with which it is associated.

The inventive principles are disclosed in their entirety in the following detailed description and the various novel details of construction and the numerous advantages will be readily understood by those skilled in the art to which this invention relates by reference to the accompanying drawings in which:

FIGURE 1 is a side elevational view of a bulkhead, with portions removed, embodying the inventive principles;

FIG. 2 is an end view of the apparatus shown in FIG. 1;

FIG. 3 is an enlarged sectional view of a portion of the apparatus shown in FIG. 1 and taken along the line 3—3;

FIG. 4 is a sectional view taken along the line 4—4 in FIG. 3;

FIG. 5 is an enlarged sectional view of another portion of the apparatus shown in FIG. 1 and taken along the line 5—5;

FIG. 6 is an enlarged detail view of a portion of the apparatus shown in FIG. 1;

FIG. 7 is a cross-sectional view of a portion of the apparatus shown in FIG. 2 and taken along the line 7—7;

FIG. 8 is an enlarged cross-sectional view of a portion of the apparatus shown in FIG. 1 and taken along the line 8—8;

FIG. 9 is a partial sectional view of a portion of the apparatus shown in FIG. 1;

FIG. 10 is a partial side elevational view of a portion of the apparatus shown in FIG. 1; and FIG. 11 is a plan view of the apparatus shown in FIG. 10.

*The bulkhead*

In general, referring to FIG. 1, the bulkhead 20 comprises a frame of quadrilateral construction having trolley means 22, 24 at each upper corner to movably support the bulkhead on overhead rails in a box car and trolley support beam means 25. Locking means are provided for locking the bulkhead in any one of a plurality of adjusted positions in the box car and include movable pin means 26, 28, 30, 32 in each corner of the frame. Pin actuating linkage 34 is mounted at each side of the frame, as shown in FIG. 2 and control handle means 36 centrally located on the bulkhead is connected to the linkage by operating shaft means 38. The aforementioned bulkhead components are, per se, conventional and may be variously otherwise positioned, interconnected, and operated without departing from the inventive concepts hereinafter disclosed in detail.

*The frame*

The sides of the frame 20 are formed by a pair of spaced vertically extending side rail members 40, 42 which take the form of conventional structural type I or H beams. Except for the forming of fastener holes and shaft apertures, the side rail members are of conventional design. It is intended that the term I beam be used to denote generically beams of that general configuration which have a central web portion and spaced flange portions. As may be seen in FIGURES 3 and 5, the beam members 40, 42 have an H-shaped cross-sectional configuration including a central web portion 43 and spaced flange portions 44, 45. In the preferred embodiment, the beam members are aluminum but may be made from other materials such as steel.

The beam members 40, 42 are interconnected by a series of vertically spaced horizontally extending cross rail members 46, 47, 48, 49, 50. These cross beams are identical and of conventional structural beam design except for various fastener holes and other apertures. Each cross rail member has an I-shaped cross-sectional configuration, as shown in FIG. 4, provided by a web portion 53 and spaced flange portions 54, 55. These beams are also preferably made from aluminum but may also be made of other materials such as steel.

It may be noted that the cross rail members do not abut or otherwise physically engage the side rail members as evidenced by the gaps 56, but are connected by upper brackets 58 and lower brackets 60 at each end. Since the brackets are identical, only the brackets 58 are shown in detail in FIGS. 3 and 11. Each bracket comprises an L-shaped member having a long leg portion 62 and a short leg portion 64 separated by a right angle bend. The plate from which the bracket is made is tapered outwardly toward both ends from a central position located on the long leg at 65. The taper provides sufficient clearance between the bracket and flange portions of the beams, as shown in FIGS. 5 and 11, to enable a certain amount of lateral displacement to be effected and to facilitate assembly. The long legs 62 of the brackets are adapted to abut the web portions 53 of the cross rail members and the short legs 64 of the brackets are adapted to abut the web portions 43 of the side rail members.

In general, the long legs are secured to the web portions 53 by means of fasteners 66, 67, 68, FIG. 3, of the general type referred to as lock bolts which comprise a headed bolt portion 69 and a cap portion 70 swaged on the end of the bolt as shown in FIG. 4. Washers 71, 72 and a cylindrical spacer 73 are utilized with the lock bolts. Short legs 64 are secured to the web portions 43 of the side rail members by means of fasteners 74, 76, shown in FIG. 5, having relatively thin heads 77, 78 and threaded nut means 79, 80.

Referring again to FIG. 1, the lowermost cross rail member 50 is located above the ends of the side rail members a substantial distance. The lowermost cross rails 49, 50 and the uppermost cross rails 46, 47 are vertically spaced from one another substantially equal distances. Uppermost cross rail 46 is spaced a substantial distance below the upper ends of the side rails so that the weight of the bulkhead is concentrated at a lower point and so that the upper portions 81, 82 of the side rail members extend beyond the uppermost cross rail 46 a substantial distance to provide cantilever type end portions for a purpose to be hereinafter described in detail. Center cross rail 48 is centrally located on the bulkhead and the linkage operating shaft means 38 extends therebelow.

The frame is centrally braced by means of vertically extending I beam sections 83, 84, and 86 which are similar to the cross rails and connected thereto in a similar manner by similar bracket means 88, 90, for example. A control handle housing is formed between cross rails 48, 49 by vertically extending channel members 92, 94 which are connected to the cross beams by similar brackets 96, 98.

The trolley beam 25 is mounted on the upper ends of the side rails 40, 42 by L-shaped brackets 101, 102, FIG. 6, having long leg portions 103 abutting the inner surface of the web portions 43 of the side rails and secured thereto by suitable fastening devices 104, 106. Short leg portions 105 of the brackets extend inwardly toward one another and trolley support blocks 106, 108 are secured thereon by fastening devices 109, 110. Each bracket may include a triangularly shaped reinforcement plate 112.

Since the frame parts are all bolted to one another, the cross-sectional configuration of the frame may be changed somewhat by applying force to the beams. In order to control the frame shape, alignment control means are provided comprising tie rod means 114, 115 fixedly secured at one end to connecting plates 116, 117 which may be pivotally connected to the brackets 101, 102 as shown in FIG. 1. The other ends of the tie rods extend through offset apertures in a V-shaped anchor plate 118, FIG. 9, which is fixedly mounted on the uppermost cross beam 46 by suitable bracket means 119. Adjusting nuts 120, 121 are threadably mounted on the ends of the tie rods so that tension or force may be controllably applied to the side rail cantilever portions at the upper frame corners through the corner brackets or, if desired, directly to the side rails. In this manner, the alignment or squareness of the frame may be adjusted or varied as desired.

*The bulkhead locking apparatus*

The locking pin means 26, 28, 30, 32 at each corner of the bulkhead are identical and therefore only one such arrangement is hereafter described in detail by reference to FIG. 2. A casting 120 having a pair of cylindrical projections 121, 122 is slidably mounted between the flange portions 44, 45 of the side rail in spaced guide brackets 123, 124 attached to the web portion of the side rail. Each guide bracket comprises a U-shaped forging 126 and a cover plate 128, FIG. 5, welded thereto.

Adjustable linkage means are pivotally connected to the casting 120 at 129 to cause sliding movement of the pin means between a retracted position and an extended locking position. The linakge means comprises link elements 130, 131 which are pivotally connected to a lever 132 pivotally mounted on a bracket 134 fixed to the side rail. It may be noted that all of the linkage and the pins are mounted within the confines of the space between the flange portions 44, 45 on the web portion 43 of the side rail members.

The linkage at each side of the bulkhead is operated by rotation of a horizontally extending shaft 136 rotatably mounted in a bearing bracket assembly 137, FIG. 7, fixedly supported on the web portion of the side rail. Link 131 is pivotally connected at 138 to a collar 139 fixed to the shaft 136.

The other end of the shaft is rotatably supported in a bearing bracket 140 mounted on the channel members 92, 94 and extends into the control handle housing between the channel members for connecting to an operating arm 142 which is mounted on top of a control handle assembly 143. A latch plate 144 is mounted at the bottom of the control housing and is adapted to releasably receive projections 145, 146 on a rockable latch member 147. Actuation of a release handle 148 and rod 149 disengages the latch member against the bias of spring elements to permit swinging movement of the control handle assembly outwardly from either side of the bulkhead causing rotation of the operating shaft 38 and retraction of the locking pins.

Referring now to FIGS. 10 and 11, lading strap anchors 150, 152 may be fixedly mounted in the corners of the bulkhead on the central web portion 43 of the side rail members. Base plate portions 154 of the strap anchors may be secured by suitable fastening means 155, 156 which also may connect the adjacent bracket means legs 157, 158. If necessary because of space requirements, cap screw type fastening devices may be employed. In addition, a lading strap storage box 160 may also be mounted on the central web portion adjacent the lading strap anchors by suitable fasteners. The lading strap apparatus may be spaced at suitable vertical intervals along the side beams or placed only at particular locations therealong.

Since the inventive principles hereinbefore described in detail may, in many instances, be otherwise variously embodied and employed, it is intended that the appended claim be construed to include those variations and changes which will occur to those skilled in the art to which the invention relates, except as limited by the prior art.

What is claimed is:

A freight bracing bulkhead assembly for bracing freight within a cargo area comprising a bulkhead frame consisting substantially of a pair of horizonatlly spaced vertically extending side rails having a generally I-shaped cross sectional configuration, a plurality of vertically spaced horizontally extending cross rails having a generally I-shaped cross sectional configuration extending between said side rails, the respective ends of each of said cross rails terminating at a spaced distance from the respective side rail to define a gap therebetween and attachment means for interconnecting the respective ends of each of said cross rails to the respective side rail and maintaining the gap therebetween for flexibility of said bulkhead frame, each of said attachment means comprising a generally L-shaped member having one leg abuttingly engaged with the web of the respective side rail and its other leg abuttingly engaged with the web of the respective cross rail and means for fixing each of said legs to the respective web, the uppermost cross rail being positioned a substantial vertical distance below the upper ends of the side rails for cantilever support of said uppermost side rail ends, locking means carried by said side rails at the outer ends thereof for adjustably affixing said bulkhead assembly within the cargo area, operating handle means supported upon said bulkhead frame for actuating said locking means between its engaged and disengaged positions, supporting means carried at least in part by said uppermost side rail ends for supporting said bulkhead assembly for movement along the cargo area, and tensioning means interconnected between said uppermost side rail ends and substantially the mid-point of said uppermost cross rail for adjusting the position of said uppermost side rail ends upon cantilever deflection thereof.

References Cited by the Examiner
UNITED STATES PATENTS

| | | | |
|---|---|---|---|
| 1,536,717 | 5/1925 | Krekel | 52—657 |
| 1,899,799 | 2/1933 | Edwards | 188—36 |
| 1,970,965 | 8/1934 | Leake | 287—189.36 |
| 2,038,461 | 4/1936 | Wellman | 52—657 |
| 2,126,511 | 8/1938 | Soule | 52—657 |
| 2,160,870 | 6/1939 | Jones | 105—376 |
| 2,242,727 | 5/1941 | Meyer | 105—414 |
| 2,382,584 | 8/1945 | Scheyer. | |
| 2,456,055 | 12/1948 | Farrar | 189—36 |
| 2,629,338 | 2/1953 | Koch | 105—376 |
| 3,007,422 | 11/1961 | Brotton | 280—179 |
| 3,063,388 | 11/1962 | Magarian et al. | 105—376 |
| 3,104,624 | 9/1963 | Candlin et al. | 105—376 |
| 3,209,707 | 10/1965 | Erickson et al. | 105—376 |

ARTHUR L. LA POINT, *Primary Examiner.*

DRAYTON E. HOFFMAN, *Examiner.*